(12) United States Patent
Liu et al.

(10) Patent No.: US 10,401,219 B2
(45) Date of Patent: Sep. 3, 2019

(54) OPTICAL PARAMETER MEASUREMENT DEVICE AND OPTICAL PARAMETER MEASUREMENT METHOD

(71) Applicants: BOE TECHNOLOGY GROUP CO., LTD., Beijing (CN); BOE (HEBEI) MOBILE DISPLAY TECHNOLOGY CO., LTD., Hebei (CN)

(72) Inventors: Yingying Liu, Beijing (CN); Zhen Wu, Beijing (CN); Yongjun Liao, Beijing (CN); Xing Li, Beijing (CN); Huijun Ma, Beijing (CN)

(73) Assignees: BOE TECHNOLOGY GROUP CO., LTD., Beijing (CN); BOE (HEBEI) MOBILE DISPLAY TECHNOLOGY CO., LTD., Hebel (CN)

( * ) Notice: Subject to any disclaimer, the term of this patent is extended or adjusted under 35 U.S.C. 154(b) by 0 days.

(21) Appl. No.: 15/970,960

(22) Filed: May 4, 2018

(65) Prior Publication Data

US 2019/0063992 A1 Feb. 28, 2019

(30) Foreign Application Priority Data

Aug. 31, 2017 (CN) .......................... 2017 1 0774933

(51) Int. Cl.
*G01J 1/44* (2006.01)
*G01J 1/04* (2006.01)
(Continued)

(52) U.S. Cl.
CPC ............... *G01J 1/44* (2013.01); *G01J 1/0228* (2013.01); *G01J 1/0425* (2013.01);
(Continued)

(58) Field of Classification Search
CPC ............ G01J 1/1626; G01J 2001/4247; G09G 2320/0247; H04N 5/2357
See application file for complete search history.

(56) References Cited

U.S. PATENT DOCUMENTS

| 2005/0127278 | A1 | 6/2005 | Cok | |
| 2013/0181111 | A1* | 7/2013 | Jahana | G01J 1/44 250/206 |
| 2014/0097902 | A1* | 4/2014 | Chen | H03G 3/3036 330/282 |

FOREIGN PATENT DOCUMENTS

| CN | 1894567 A | 1/2007 |
| CN | 101221068 A | 7/2008 |

(Continued)

OTHER PUBLICATIONS

First Office Action for Chinese Application No. 201710774933.X, dated Dec. 25, 2018, 9 Pages.

*Primary Examiner* — Shawn Decenzo
(74) *Attorney, Agent, or Firm* — Brooks Kushman P.C.

(57) ABSTRACT

An optical parameter measurement device and a corresponding method are provided. A light beam from a to-be-tested display panel is split by a beam-splitting assembly into at least two testing light beams. A voltage value corresponding to a first testing light beam is measured by a trans-impedance amplification circuit corresponding to a first optical sensor. Next, an integration time period is determined by a control circuit according to voltage values from the trans-impedance amplification circuit and a predetermined relational model between voltage values corresponding to the light intensities and integration time periods. A voltage value corresponding to a second testing light beam is finely measured by the integration circuit corresponding to a second optical sensor within the integration time period. Finally, the display brightness value of the to-be-tested display panel is deter- (Continued)

mined by the control circuit according to a voltage value from the integration circuit within the integration time period.

20 Claims, 5 Drawing Sheets

(51) Int. Cl.
  *G01J 1/16* (2006.01)
  *G01J 1/46* (2006.01)
  *G01J 1/02* (2006.01)
  *G01J 1/42* (2006.01)
(52) U.S. Cl.
  CPC ........... *G01J 1/0477* (2013.01); *G01J 1/1626* (2013.01); *G01J 1/46* (2013.01); *G01J 1/0414* (2013.01); *G01J 2001/4247* (2013.01); *G01J 2001/446* (2013.01); *G01J 2001/4413* (2013.01)

(56) References Cited

FOREIGN PATENT DOCUMENTS

| | | | |
|---|---|---|---|
| CN | 101778191 A | 7/2010 | |
| CN | 103207013 A | 7/2013 | |
| CN | 103267627 A | 8/2013 | |
| CN | 203981379 U | 12/2014 | |
| JP | 4699925 B2 | 6/2011 | |
| WO | 2017104474 A1 | 6/2017 | |
| WO | WO-2017104474 A1 * | 6/2017 | ................ G01J 1/00 |

* cited by examiner

OPTICAL PARAMETER MEASUREMENT DEVICE AND OPTICAL PARAMETER MEASUREMENT METHOD

CROSS-REFERENCE TO RELATED APPLICATION

This application claims priority to Chinese Patent Application No. 201710774933.X filed on Aug. 31, 2017, which is incorporated herein by reference in its entirety.

TECHNICAL FIELD

The present disclosure relates to the field of optical measurement technology, in particular to an optical parameter measurement device and an optical parameter measurement method.

BACKGROUND

In related art, an optical sensor may be used to perform integral measurement on a target light source, so as to measure a light intensity. However, in the case that the light intensity of the target light source changes within a certain range (e.g., in the case that an optical parameter of a to-be-tested display panel, e.g., brightness of the to-be-tested display panel, is measured), a micro-controller unit (MCU) needs to be used, so as to adjust an integration time period in accordance with an integral result.

To be specific, in a scheme for measuring the brightness of the display panel, a most common method is to integrate a photocurrent through a silicon photocell, and then adjust the integration time period in accordance with intensity of the photocurrent. Usually, the photocurrent may be sampled for many times within different integration time periods, so as to calculate an appropriate integration time period. At this time, it needs to take a very long adjusting time period to measure an nA-level photocurrent.

Hence, for a current optical sensor-based brightness measurement mode, its measurement speed is relatively low.

SUMMARY

In one aspect, the present disclosure provides in some embodiments an optical parameter measurement device, including a beam-splitting assembly, a first optical sensor, a second optical sensor, a trans-impedance amplification circuit, an integration circuit and a control circuit. The beam-splitting assembly is configured to split a light beam from a to-be-tested display panel into at least a first testing light beam and a second testing line beam. The first optical sensor is configured to convert a light intensity of the first testing light beam into a photocurrent corresponding to the first testing light beam and input the photocurrent corresponding to the first testing light beam to the trans-impedance amplification circuit. The trans-impedance amplification circuit is configured to subject the photocurrent corresponding to the first testing light beam to current-to-voltage conversion to acquire a voltage value corresponding to the first testing light beam, amplify the voltage value corresponding to the first testing light beam at a predetermined ratio to obtain an amplified voltage value corresponding to the first testing light beam, and output the amplified voltage value corresponding to the first testing light beam. The second optical sensor is configured to convert a light intensity of the second testing light beam into a photocurrent corresponding to the second testing light beam, and input the photocurrent corresponding to the second testing light beam to the integration circuit. The integration circuit is configured to integrate the photocurrent corresponding to the second testing light beam within a predetermined integration time period under the control of the control circuit, and output a corresponding voltage value. The control circuit is configured to determine an integration time period for the integration circuit in accordance with the amplified voltage value outputted by the trans-impedance amplification circuit, control the predetermined integration time period for the integration circuit, and determine a display brightness value of the to-be-tested display panel in accordance with a total voltage value accumulatively outputted by the integration circuit within the predetermined integration time period.

In a possible embodiment of the present disclosure, in the optical parameter measurement device, the control circuit is further configured to determine the integration time period for the integration circuit in accordance with a plurality of voltage values outputted by the trans-impedance amplification circuit and a predetermined relational model between voltage values corresponding to the light intensities and integration time periods.

In a possible embodiment of the present disclosure, in the optical parameter measurement device, the control circuit is further configured to determine a time difference between a time point when a maximum voltage value is outputted by the trans-impedance amplification circuit and a time point when a minimum voltage value is outputted by the trans-impedance amplification circuit, control the integration circuit to output the corresponding voltage value within the time difference, and determine a flicker value of the to-be-tested display panel in accordance with a voltage value outputted by the integration circuit corresponding to a maximum brightness value and a voltage value outputted by the integration circuit corresponding to a minimum brightness value.

In a possible embodiment of the present disclosure, in the optical parameter measurement device, the beam-splitting assembly is a beam-splitting plate, a prism, a grating or an optical fiber.

In a possible embodiment of the present disclosure, in the optical parameter measurement device, the light intensity of the first testing light beam is smaller than the light intensity of the second testing light beam.

In a possible embodiment of the present disclosure, in the optical parameter measurement device, the beam-splitting assembly is a beam-splitting plate, a prism or a grating; the optical parameter measurement device further includes a reflector arranged in an optical path between the beam-splitting assembly and the second optical sensor.

In a possible embodiment of the present disclosure, the reflector is configured to change an optical path of the second testing light beam in such a manner that the second testing light beam is parallel to the first testing light beam after the optical path of the second testing light beam is changed.

In a possible embodiment of the present disclosure, the optical parameter measurement device further includes a first filter arranged in an optical path between the beam-splitting assembly and the first optical sensor.

In a possible embodiment of the present disclosure, the optical parameter measurement device further includes a second filter arranged in an optical path between the beam-splitting assembly and the second optical sensor.

In a possible embodiment of the present disclosure, in the optical parameter measurement device, each of the first optical sensor and the second optical sensor is a photodiode.

In a possible embodiment of the present disclosure, in the optical parameter measurement device, the photodiode is a silicon photocell.

In a possible embodiment of the present disclosure, the optical parameter measurement device further includes an analog-to-digital conversion circuit configured to convert the amplified voltage value from the trans-impedance amplification circuit and the corresponding voltage value from the integration circuit into digital signals, and output the digital signals to the control circuit.

In another aspect, the present disclosure provides in some embodiments an optical parameter measurement method using the above-mentioned optical parameter measurement device, including steps of: splitting, by the beam-splitting assembly, the light beam from the to-be-tested display panel into at least the first testing light beam and the second testing light beam; converting, by the first optical sensor, the light intensity of the first testing light beam into the photocurrent corresponding to the first testing light beam, and inputting by the first optical sensor, the photocurrent corresponding to the first testing light beam to the trans-impedance amplification circuit; subjecting, by the trans-impedance amplification circuit, the photocurrent corresponding to the first testing light beam to a current-to-voltage conversion to acquire the voltage value corresponding to the first testing light beam, amplifying, by the trans-impedance amplification circuit, the voltage value corresponding to the first testing light beam at the predetermined ratio to obtain the amplified voltage value corresponding to the first testing light beam, and outputting, by the trans-impedance amplification circuit, the amplified voltage value corresponding to the first testing light beam; determining, by the control circuit, the integration time period for the integration circuit in accordance with the amplified voltage value outputted by the trans-impedance amplification circuit; converting, by the second optical sensor, the light intensity of the second testing light beam into the photocurrent corresponding to the second testing light beam, and inputting, by the second optical sensor, the photocurrent corresponding to the second testing light beam to the integration circuit; and controlling, by the control circuit, the integration circuit to integrate the photocurrent corresponding to the second testing light beam within the predetermined integration time period, and determining, by the control circuit, the display brightness value of the to-be-tested display panel in accordance with the total voltage value outputted by the integration circuit within the predetermined integration time period.

In a possible embodiment of the present disclosure, in optical parameter measurement method, the step of determining, by the control circuit, the integration time period for the integration circuit in accordance with the voltage value outputted by the trans-impedance amplification circuit includes: determining, by the control circuit, the integration time period for the integration circuit in accordance with a plurality of voltage values outputted by the trans-impedance amplification circuit and a predetermined relational model between voltage values corresponding to the light intensities and integration time periods.

In a possible embodiment of the present disclosure, the optical parameter measurement method further includes: determining, by the control circuit, a time difference between a time point when a maximum voltage value is outputted by the trans-impedance amplification circuit and a time point when a minimum voltage value is outputted by the trans-impedance amplification circuit as the predetermined integration time period; and controlling, by the control circuit, the integration circuit to output the voltage value within the predetermined integration time period, and determining, by the control circuit, a flicker value of the to-be-tested display panel in accordance with a voltage value outputted by the integration circuit corresponding to a maximum brightness value and a voltage value outputted by the integration circuit corresponding to a minimum brightness value.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain other drawings without any creative effort. Shapes and sizes of the members in the drawings are for illustrative purposes only, but shall not be used to reflect any actual scale.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
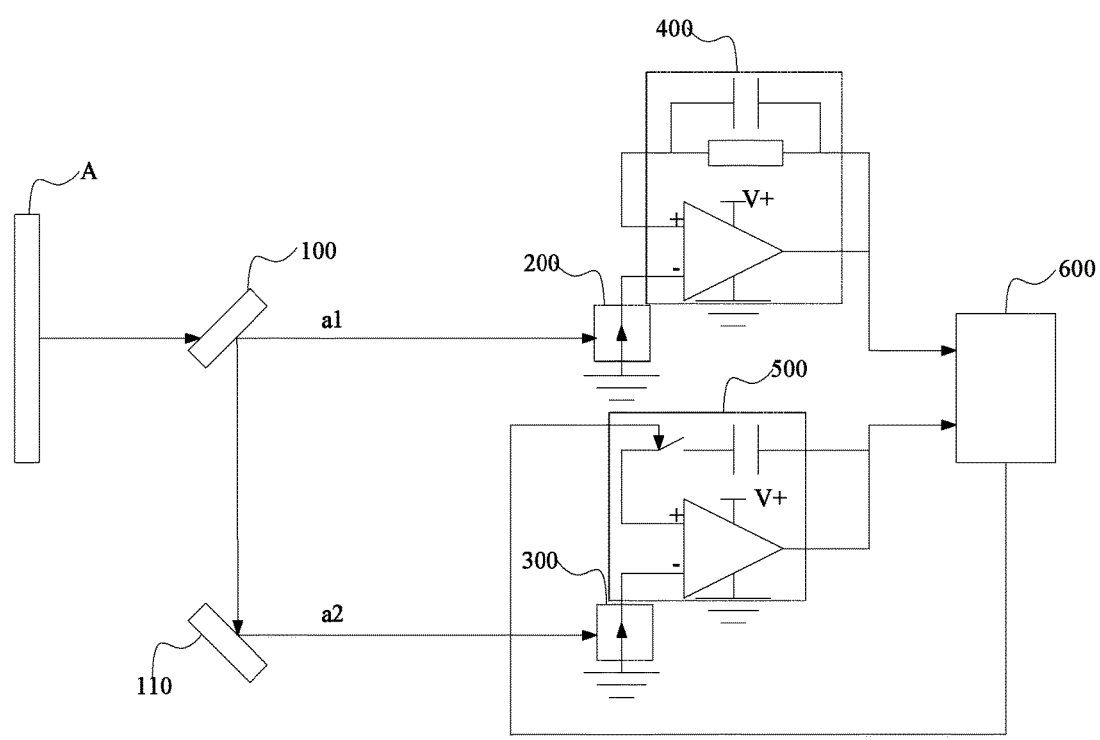
FIG. 1 is a schematic view showing an optical parameter measurement device according to one embodiment of the present disclosure.

The present disclosure provides in some embodiments an optical parameter measurement device which, as shown in FIG. 1, includes a beam-splitting assembly 100, a first optical sensor 200, a second optical sensor 300, a trans-impedance amplification circuit 400, an integration circuit 500 and a control circuit 600. The beam-splitting assembly 100 is configured to split a light beam from a to-be-tested display panel A into at least a first testing light beam a1 and a second testing line beam a2. The first optical sensor 200 is configured to convert a light intensity of the first testing light beam a1 into a photocurrent corresponding to the first testing light beam a1 and input the photocurrent corresponding to the first testing light beam a1 to the trans-impedance amplification circuit 400. The trans-impedance amplification circuit 400 is configured to subject the photocurrent corresponding to the first testing light beam a1 to current-to-voltage conversion to acquire a voltage value corresponding to the first testing light beam a1, amplify the voltage value corresponding to the first testing light beam a1 at a predetermined ratio to obtain an amplified voltage value corresponding to the first testing light beam, and output the amplified voltage value corresponding to the first testing light beam a1. The second optical sensor 300 is configured to convert a light intensity of the second testing light beam a2 into a photocurrent corresponding to the second testing light beam a2, and input the photocurrent corresponding to the second testing light beam a2 to the integration circuit 500. The integration circuit 500 is configured to integrate the photocurrent corresponding to the second testing light beam a2 within a predetermined integration time period under the control of the control circuit 600, and output a corresponding voltage value. The control circuit 600 is configured to determine an integration time period for the integration circuit 500 in accordance with the voltage value outputted by the trans-impedance amplification circuit 400, control the predetermined integration time period for the integration circuit 500, and determine a display brightness value of the to-be-tested display panel A in accordance with a voltage value outputted by the integration circuit 500 within the predetermined integration time period.

According to the optical parameter measurement device in the embodiments of the present disclosure, the trans-impedance amplification circuit 400 may acquire in real time the light intensity of the first testing light beam a1 of the light beam from the to-be-tested display panel A, and directly calculate the integration time period for the integration circuit 500. Hence, it is able to omit a long-term adjustment procedure of the integration time period, thereby to increase a measurement speed in the case of measuring a brightness value of the to-be-tested display panel A by the optical sensor.

To be specific, in the optical parameter measurement device, a change rate of the voltage values from the integration circuit 500 within a certain time period is in direct proportion to the light intensity of the second testing light beam received by the second optical sensor 300. Hence, the control circuit 600 may calculate the change rate of the voltage values from the integration circuit 500, convert the change rate into the light intensity, and then calculate the display brightness value.

To be specific, in the optical parameter measurement device, a relational model between the integration time periods and the voltage values corresponding to the light intensities may be pre-stored in the control circuit 600. In this way, the control circuit 600 may determine the integration time period for the integration circuit 500 in accordance with a plurality of voltage values from the trans-impedance amplification circuit 400 and the predetermined relational model between voltage values corresponding to the light intensities and integration time periods.

During the implementation, in the optical parameter measurement device, apart from measuring the brightness value of the to-be-tested display panel A, the optical parameter measurement device may be further used to measure a flicker value of the to-be-tested display panel A. To be specific, the control circuit 600 may be further configured to determine a time difference between a time point when a maximum voltage value is outputted by the trans-impedance amplification circuit 400 and a time point when a minimum voltage value is outputted by the trans-impedance amplification circuit 400, control the integration circuit 500 to output the corresponding voltage value within the time difference, and determine the flicker value of the to-be-tested display panel A in accordance with a voltage value outputted by the integration circuit 500 corresponding to a maximum brightness value and a voltage value outputted by the integration circuit 500 corresponding to a minimum brightness value. In other words, the flicker value may be roughly measured by the trans-impedance amplification circuit 400, so as to acquire a waveform of an output voltage corresponding to the first testing light beam a1. Next, the control circuit 600 may calculate the time difference between the time point when the maximum voltage value is outputted and the time point when the minimum voltage value is outputted in accordance with the waveform. Next, the flicker value may be finely measured through the integration circuit 500. To be specific, the control circuit 600 may input the time difference to the integration circuit 500 to enable the integration circuit 500 to output the voltage value corresponding to the maximum brightness value and the voltage value corresponding to the minimum brightness value, and then calculate the flicker value in accordance with the voltage value outputted by the integration circuit 500 corresponding to the maximum brightness value and the voltage value outputted by the integration circuit 500 corresponding to the minimum brightness value.

To be specific, in the optical parameter measurement device, the flicker value and the brightness value may be measured simultaneously or in a time-division manner, which will not be particularly defined herein.

During the implementation, in the optical parameter measurement device, the function of the control circuit 600 may be implemented by a Microcontroller Unit (MCU).

During the implementation, in the optical parameter measurement device, each of the trans-impedance amplification circuit 400 and the integration circuit 500 mainly consists of an operational amplifier. To be specific, as shown in FIG. 1, a positive input end of the operational amplifier of the trans-impedance amplification circuit 400 is connected to an output end of the operational amplifier of the trans-impedance amplification circuit 400 via a resistor and a capacitor connected in parallel to each other, a negative input end of the operational amplifier of the trans-impedance amplification circuit 400 is connected to an input end of the first optical sensor 200, one of two power source input ends of the operational amplifier of the trans-impedance amplification circuit 400 receives a constant positive potential, and the other of the two power source input ends is grounded. A positive input end of the operational amplifier of the integration circuit 500 is connected to an output end of the operational amplifier of the integration circuit 500 via a switch and a capacitor connected in series to each other, a negative input end of the operational amplifier of the integration circuit 500 is connected to an input end of the second optical sensor 300, one of two power source input ends of the operational amplifier of the integration circuit 500 receives a constant positive potential, and the other of the two power source input ends is grounded.

Figure 2:
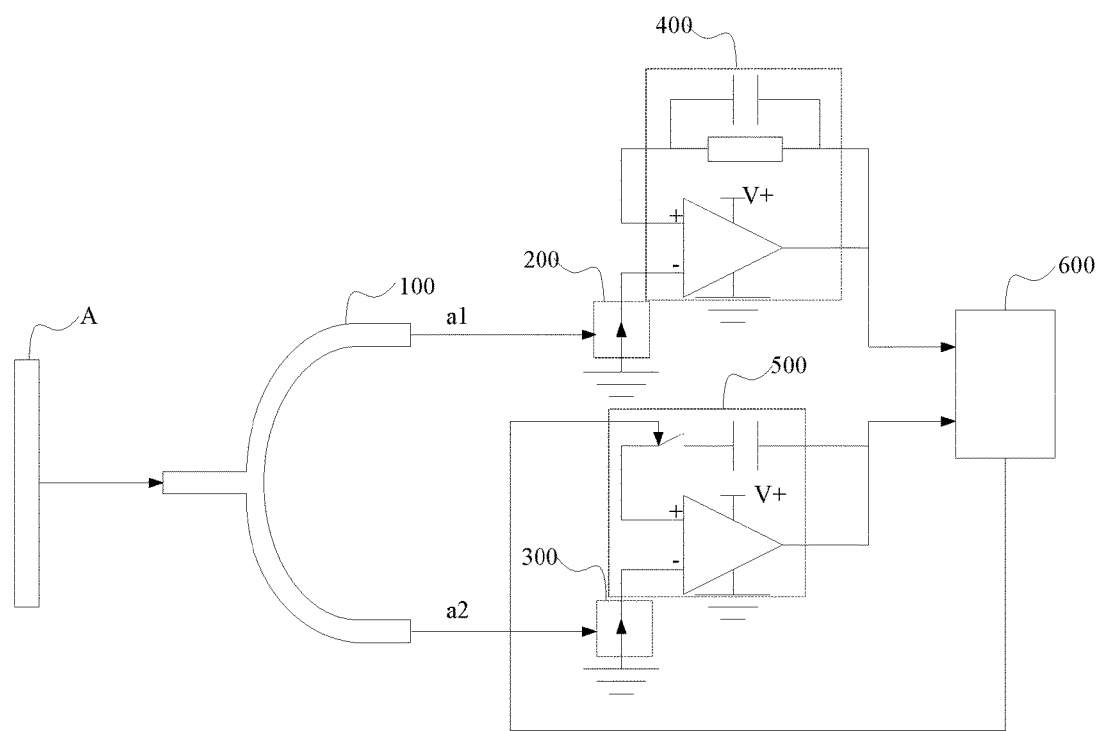
FIG. 2 is a schematic view showing another optical parameter measurement device according to one embodiment of the present disclosure.

During the implementation, in the optical parameter measurement device, the beam-splitting assembly 100 may include a beam-splitting plate, a prism, a grating or an optical fiber, so as to achieve its beam-splitting function. To be specific, in FIG. 2, the beam-splitting assembly 100 is an optical fiber, and in FIG. 1, the beam-splitting assembly 100 is a beam-splitting plate. An emergent angle of each of the first testing light beam a1 and the second testing light beam a2 depends on an angle of the beam-splitting assembly 100 relative to the to-be-tested display panel A.

Usually, as shown in FIG. 1, in the case that the beam-splitting assembly 100 is a beam-splitting plate, a prism or a grating, it is able for the beam-splitting assembly 100 to split an incident light beam into at least two testing light beams a1 and a2 perpendicular to each other. In order to facilitate the design of an optical path and provide the optical parameter measurement device with a more compact structure, usually the first testing light beam a1 received by the first optical sensor 200 is parallel to the second testing light beam a2 received by the second optical sensor 300. During the implementation, in the optical parameter measurement device, as shown in FIG. 1, in the case that the beam-splitting assembly 100 is the beam-splitting plate, the prism or the grating, the optical parameter measurement device may further include a reflector 110 arranged in an optical path between the beam-splitting assembly 100 and the second optical sensor 300, so as to change the optical path of the second testing light beam a2 in such a manner that the second testing light beam a2 is parallel to the first testing light beam a1.

During the implementation, in the optical parameter measurement device, the brightness value and the flicker value are measured roughly using the first testing light beam a1, and measured finely using the second testing light beam a2. Hence, the light intensity of the first testing light beam a1 may be smaller than the light intensity of the second testing light beam a2, so as to provide the portion of the light beam from the to-be-tested display panel A for the fine measurement as much as possible, thereby to improve the accuracy of the fine measurement. It should be appreciated that, the beam-splitting assembly 100 may split the light beam into the testing light beams a1 and a2 at an identical wavelength range, merely with different light intensities.

Figure 3:
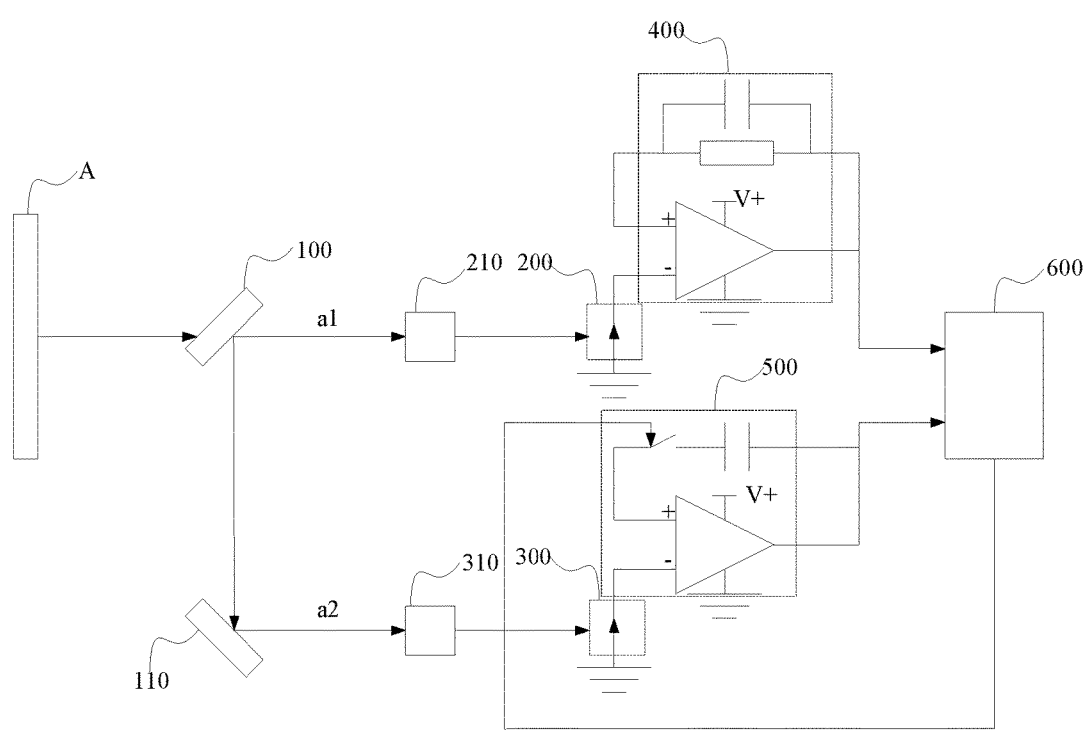
FIG. 3 is a schematic view showing yet another optical parameter measurement device according to one embodiment of the present disclosure.

During the implementation, in the optical parameter measurement device, as shown in FIG. 3, the optical parameter measurement device may further include a first filer 210 arranged in an optical path between the beam-splitting assembly 100 and the first optical sensor 200, and the first filer 210 is able to filter out non-visible light beam component in the first testing light beam a1, thereby to improve the measurement accuracy.

During the implementation, in the optical parameter measurement device, as shown in FIG. 3, the optical parameter measurement device may further include a second filer 310 arranged in an optical path between the beam-splitting assembly 100 and the second optical sensor 300, and the second filer 310 is able to filter out non-visible light beam component in the second testing light beam a2, thereby to improve the measurement accuracy.

During the implementation, in the optical parameter measurement device, each of the first optical sensor 200 and the second optical sensor 300 may be a photodiode, so as to achieve a photovoltaic conversion function.

During the implementation, in the optical parameter measurement device, the photodiode may be a silicon photocell.

Figure 4:
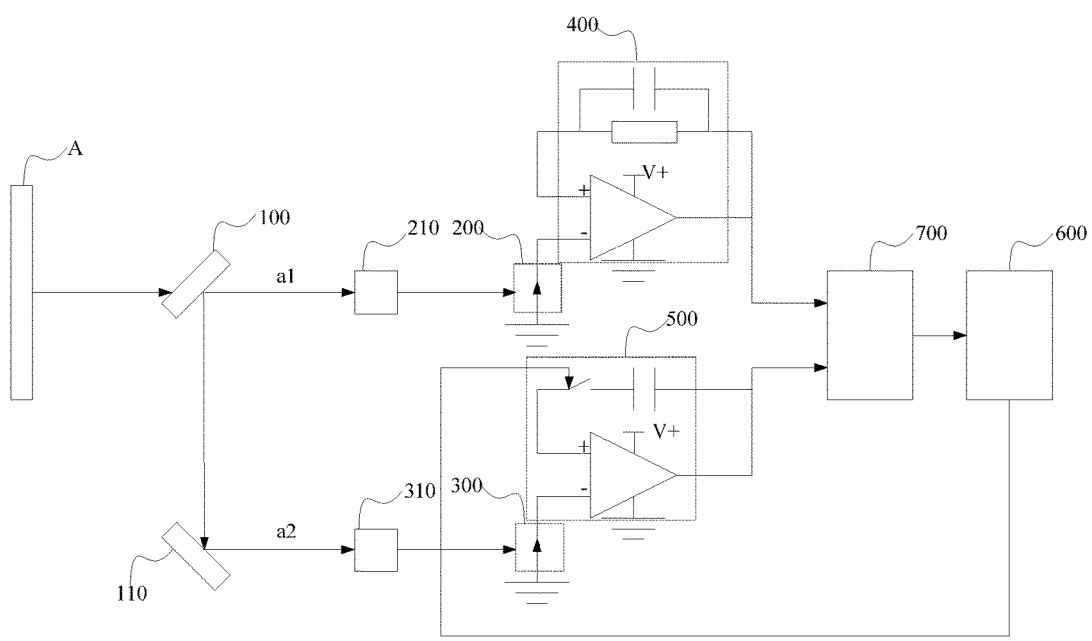
FIG. 4 is a schematic view showing still yet another optical parameter measurement device according to one embodiment of the present disclosure.

During the implementation, as shown in FIG. 4, the optical parameter measurement device may further include an analog-to-digital conversion circuit 700 configured to convert the voltage value from the trans-impedance amplification circuit 400 and the voltage value from the integration circuit 500 into digital signals, and output the digital signals to the control circuit 600. The control circuit 600 may then directly process the digital signals, so as to facilitate the subsequent signal processing and storage.

Based on an identical inventive concept, the present disclosure further provides in some embodiments an optical parameter measurement method using the above-mentioned optical parameter measurement device. A principle of the optical parameter measurement method is similar to that of the optical parameter measurement device, so the implementation of the optical parameter measurement method may refer to that mentioned above, which will not be particularly defined herein.

Figure 5:
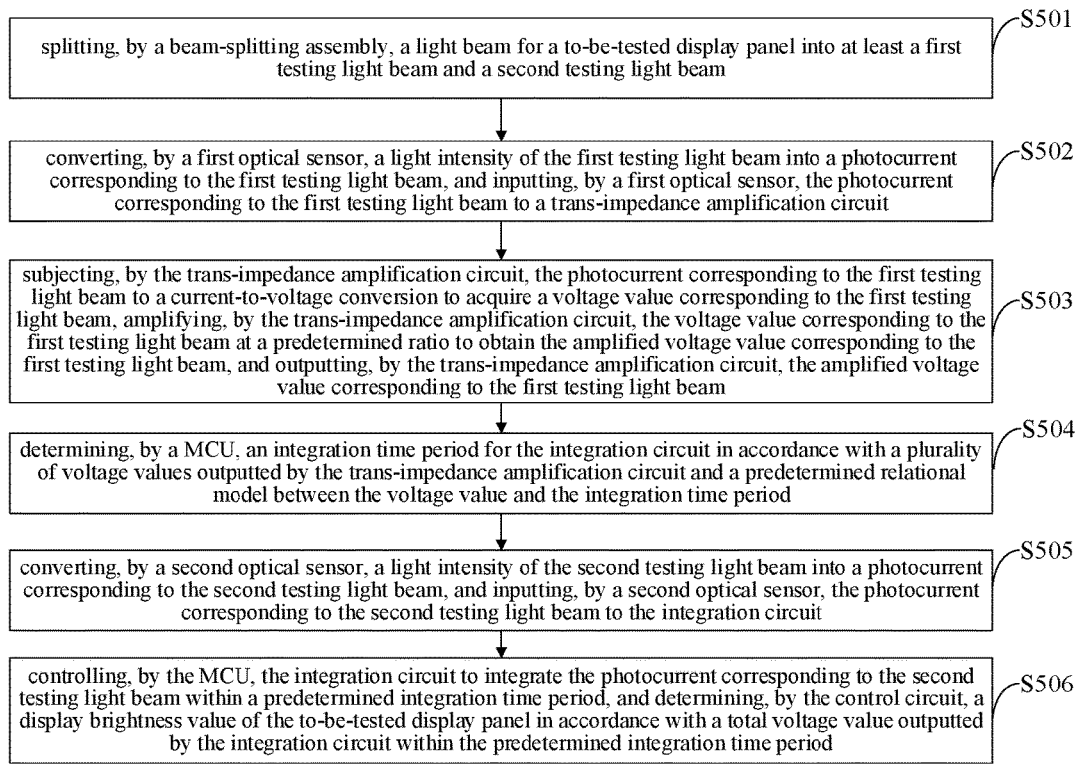
FIG. 5 is a flow chart of an optical parameter measurement method using the optical parameter measurement device according to one embodiment of the present disclosure.

As shown in FIG. 5, the present disclosure further provides in some embodiments the optical parameter measurement method including: S501 of splitting, by a beam-splitting assembly, a light beam for a to-be-tested display panel into at least a first testing light beam and a second testing light beam; S502 of converting, by a first optical sensor, a light intensity of the first testing light beam into a photocurrent corresponding to the first testing light beam, and inputting, by a first optical sensor, the photocurrent corresponding to the first testing light beam to a trans-impedance amplification circuit; S503 of subjecting, by the trans-impedance amplification circuit, the photocurrent corresponding to the first testing light beam to a current-to-voltage conversion to acquire a voltage value corresponding to the first testing light beam, amplifying, by the trans-impedance amplification circuit, the voltage value corresponding to the first testing light beam at a predetermined ratio to obtain an amplified voltage value corresponding to the first testing light beam, and outputting, by the trans-impedance amplification circuit, the amplified voltage value corresponding to the first testing light beam; S504 of determining, by a control circuit, an integration time period for an integration circuit in accordance with the amplified voltage value outputted by the trans-impedance amplification circuit; S505 of converting, by a second optical sensor, a light intensity of the second testing light beam into a photocurrent corresponding to the second testing light beam, and inputting, by a second optical sensor, the photocurrent corresponding to the second testing light beam to the integration circuit; and S506 of controlling, by the control circuit, the integration circuit to integrate the photocurrent corresponding to the second testing light beam within a predetermined integration time period, and determining, by the control circuit, a display brightness value of the to-be-tested display panel in accordance with a voltage value outputted by the integration circuit within the predetermined integration time period.

According to the optical parameter measurement method in the embodiments of the present disclosure, the trans-impedance amplification circuit may acquire in real time the light intensity of the first testing light beam of the light beam from the to-be-tested display panel A, and directly calculate the integration time period for the integration circuit. Hence, it is able to omit a long-term adjustment procedure of the integration time period, thereby to increase a measurement speed in the case of measuring a brightness value of the to-be-tested display panel A by the optical sensor.

During the implementation, in the optical parameter measurement method using the above-mentioned optical parameter measurement device, the step S504 of determining by the control circuit the integration time period for the integration circuit in accordance with the amplified voltage value outputted by the trans-impedance amplification circuit may include: determining, by the control circuit, the integration time period for the integration circuit in accordance with a plurality of voltage values outputted by the trans-impedance amplification circuit and a predetermined relational model between voltage values corresponding to the light intensities and integration time periods.

Figure 6:
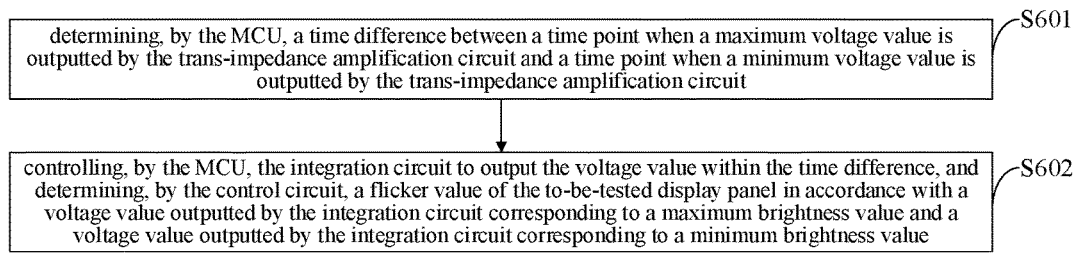
FIG. 6 is another flow chart of the optical parameter measurement method using the optical parameter measurement device according to one embodiment of the present disclosure.

During the implementation, in the optical parameter measurement method using the above-mentioned optical parameter measurement device, as shown in FIG. 6, the optical parameter measurement method may further include: S601 of determining, by the control circuit, a time difference between a time point when a maximum voltage value is outputted by the trans-impedance amplification circuit and a time point when a minimum voltage value is outputted by the trans-impedance amplification circuit; and S602 of controlling, by the control circuit, the integration circuit to output the voltage value within the time difference, and determining, by the control circuit, a flicker value of the to-be-tested display panel in accordance with a voltage value outputted by the integration circuit corresponding to a maximum brightness value and a voltage value outputted by the integration circuit corresponding to a minimum brightness value.

To be specific, in the optical parameter measurement method using the above-mentioned optical parameter measurement device, the flicker value may be roughly measured through the trans-impedance amplification circuit, so as to acquire a waveform of an output voltage corresponding to the first testing light beam. Next, the control circuit may calculate the time difference between the time point when the maximum voltage value is outputted and the time point when the minimum voltage value is outputted in accordance with the waveform. Next, the flicker value may be finely measured through the integration circuit. To be specific, the control circuit may input the time difference to the integration circuit, and then calculate the flicker value in accordance with the voltage value outputted by the integration circuit corresponding to the maximum brightness value and the voltage value outputted by the integration circuit corresponding to the minimum brightness value.

To be specific, in the optical parameter measurement method using the above-mentioned optical parameter measurement device, the steps of measuring the flicker value (i.e., S601 and S602) and the steps of measuring the brightness value (i.e., S504 to S506) may be performed simultaneously or in a time-division manner, which will not be particularly defined herein.

According to the optical parameter measurement device and the optical parameter measurement method in the embodiments of the present disclosure, the light beam from the to-be-tested display panel is split by the beam-splitting assembly into at least two testing light beams. The voltage value corresponding to the first testing light beam is measured by the trans-impedance amplification circuit corresponding to the first optical sensor. Next, the integration time period is determined by the control circuit in accordance with the voltage value from the trans-impedance amplification circuit. The voltage value corresponding to the second testing light beam is finely measured by the integration circuit corresponding to the second optical sensor within the determined integration time period. Finally, the display brightness value of the to-be-tested display panel is determined by the control circuit in accordance with the voltage value from the integration circuit within the integration time period. The trans-impedance amplification circuit may acquire in real time the light intensity of the first testing light beam of the light beam from the to-be-tested display panel, and directly calculate the integration time period for the integration circuit. As a result, it is able to omit a long-term adjustment procedure of the integration time period, thereby to increase a measurement speed in the case of measuring the brightness value of the to-be-tested display panel by the optical sensor.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An optical parameter measurement device, comprising a beam-splitting assembly, a first optical sensor, a second optical sensor, a trans-impedance amplification circuit, an integration circuit and a control circuit, wherein
    the beam-splitting assembly is configured to split a light beam from a to-be-tested display panel into at least a first testing light beam and a second testing light beam;
    the first optical sensor is configured to convert a light intensity of the first testing light beam into a photocurrent corresponding to the first testing light beam and input the photocurrent corresponding to the first testing light beam to the trans-impedance amplification circuit;
    the trans-impedance amplification circuit is configured to subject the photocurrent corresponding to the first testing light beam to a current-to-voltage conversion to acquire a voltage value corresponding to the first testing light beam, amplify the voltage value corresponding to the first testing light beam at a predetermined ratio to obtain an amplified voltage value corresponding to the first testing light beam, and output the amplified voltage value corresponding to the first testing light beam;
    the second optical sensor is configured to convert a light intensity of the second testing light beam into a photocurrent corresponding to the second testing light beam, and input the photocurrent corresponding to the second testing light beam to the integration circuit;
    the integration circuit is configured to, under the control of the control circuit, integrate the photocurrent corresponding to the second testing light beam within a predetermined integration time period, and output a corresponding voltage value; and
    the control circuit is configured to determine an integration time period for the integration circuit in accordance with the amplified voltage value outputted by the trans-impedance amplification circuit, control the predetermined integration time period for the integration circuit, and determine a display brightness value of the to-be-tested display panel in accordance with a voltage value outputted by the integration circuit within the predetermined integration time period.

2. The optical parameter measurement device according to claim 1, wherein
    the control circuit is further configured to determine the integration time period for the integration circuit in accordance with a plurality of voltage values outputted by the trans-impedance amplification circuit and a predetermined relational model between voltage values corresponding to the light intensities and integration time periods.

3. The optical parameter measurement device according to claim 1, wherein the control circuit is further configured to:
   determine a time difference between a time point when a maximum voltage value is outputted by the trans-impedance amplification circuit and a time point when a minimum voltage value is outputted by the trans-impedance amplification circuit;
   control the integration circuit to output the corresponding voltage value within the time difference; and
   determine a flicker value of the to-be-tested display panel in accordance with a voltage value outputted by the integration circuit corresponding to a maximum brightness value and a voltage value outputted by the integration circuit corresponding to a minimum brightness value.

4. The optical parameter measurement device according to claim 1, wherein
   the beam-splitting assembly is a beam-splitting plate, a prism, a grating or an optical fiber.

5. The optical parameter measurement device according to claim 1, wherein
   the light intensity of the first testing light beam is smaller than the light intensity of the second testing light beam.

6. The optical parameter measurement device according to claim 1, wherein
   the beam-splitting assembly is a beam-splitting plate, a prism or a grating; and
   the optical parameter measurement device further comprises a reflector arranged in an optical path between the beam-splitting assembly and the second optical sensor.

7. The optical parameter measurement device according to claim 6, wherein
   the reflector is configured to change an optical path of the second testing light beam in such a manner that the second testing light beam is parallel to the first testing light beam after the optical path of the second testing light beam is changed.

8. The optical parameter measurement device according to claim 1, further comprising:
   a first filter arranged in an optical path between the beam-splitting assembly and the first optical sensor.

9. The optical parameter measurement device according to claim 1, further comprising:
   a second filter arranged in an optical path between the beam-splitting assembly and the second optical sensor.

10. The optical parameter measurement device according to claim 1, wherein
    each of the first optical sensor and the second optical sensor is a photodiode.

11. The optical parameter measurement device according to claim 10, wherein
    the photodiode is a silicon photocell.

12. The optical parameter measurement device according to claim 1, further comprising:
    an analog-to-digital conversion circuit configured to convert the amplified voltage value from the trans-impedance amplification circuit and the corresponding voltage value from the integration circuit into digital signals, and output the digital signals to the control circuit.

13. The optical parameter measurement device according to claim 2, wherein the control circuit is further configured to:
    determine a time difference between a time point when a maximum voltage value is outputted by the trans-impedance amplification circuit and a time point when a minimum voltage value is outputted by the trans-impedance amplification circuit;
    control the integration circuit to output the corresponding voltage value within the time difference; and
    determine a flicker value of the to-be-tested display panel in accordance with a voltage value outputted by the integration circuit corresponding to a maximum brightness value and a voltage value outputted by the integration circuit corresponding to a minimum brightness value.

14. The optical parameter measurement device according to claim 2, wherein
    the beam-splitting assembly is a beam-splitting plate, a prism, a grating or an optical fiber.

15. The optical parameter measurement device according to claim 2, wherein
    the light intensity of the first testing light beam is smaller than the light intensity of the second testing light beam.

16. The optical parameter measurement device according to claim 2, wherein
    the beam-splitting assembly is a beam-splitting plate, a prism or a grating; and
    the optical parameter measurement device further comprises a reflector arranged in an optical path between the beam-splitting assembly and the second optical sensor.

17. The optical parameter measurement device according to claim 2, further comprising:
    a first filter arranged in an optical path between the beam-splitting assembly and the first optical sensor; and
    a second filter arranged in an optical path between the beam-splitting assembly and the second optical sensor.

18. A optical parameter measurement method using the optical parameter measurement device according to claim 1, comprising:
    splitting, by the beam-splitting assembly, the light beam from the to-be-tested display panel into at least the first testing light beam and the second testing light beam;
    converting, by the first optical sensor, the light intensity of the first testing light beam into the photocurrent corresponding to the first testing light beam, and inputting, by the first optical sensor, the photocurrent corresponding to the first testing light beam to the trans-impedance amplification circuit;
    subjecting, by the trans-impedance amplification circuit, the photocurrent corresponding to the first testing light beam to the current-to-voltage conversion to acquire the voltage value corresponding to the first testing light beam, amplifying, by the trans-impedance amplification circuit, the voltage value corresponding to the first testing light beam at the predetermined ratio to obtain the amplified voltage value corresponding to the first testing light beam, and outputting, by the trans-impedance amplification circuit, the amplified voltage value corresponding to the first testing light beam;
    determining, by the control circuit, the integration time period for the integration circuit in accordance with the amplified voltage value outputted by the trans-impedance amplification circuit;

converting, by the second optical sensor, the light intensity of the second testing light beam into the photocurrent corresponding to the second testing light beam, and inputting, by the second optical sensor, the photocurrent corresponding to the second testing light beam to the integration circuit; and controlling, by the control circuit, the integration circuit to integrate the photocurrent corresponding to the second testing light beam within the predetermined integration time period, and determining, by the control circuit, the display brightness value of the to-be-tested display panel in accordance with the voltage value outputted by the integration circuit within the predetermined integration time period.

19. The optical parameter measurement method according to claim 18, wherein the step of determining, by the control circuit, the integration time period for the integration circuit in accordance with the voltage value outputted by the trans-impedance amplification circuit comprises:

determining, by the control circuit, the integration time period for the integration circuit in accordance with a plurality of voltage values outputted by the trans-impedance amplification circuit and a predetermined relational model between voltage values corresponding to the light intensities and integration time periods.

20. The optical parameter measurement method according to claim 18, further comprising:

determining, by the control circuit, a time difference between a time point when a maximum voltage value is outputted by the trans-impedance amplification circuit and a time point when a minimum voltage value is outputted by the trans-impedance amplification circuit; and controlling, by the control circuit, the integration circuit to output the corresponding voltage value within the time difference, and determining, by the control circuit, a flicker value of the to-be-tested display panel in accordance with a voltage value outputted by the integration circuit corresponding to a maximum brightness value and a voltage value outputted by the integration circuit corresponding to a minimum brightness value.

* * * * *